Aug. 21, 1956

H. JÖRGENSEN 2,759,674

THERMOSTATIC SUCTION PRESSURE REGULATOR
FOR REFRIGERATION INSTALLATIONS

Filed May 26, 1953

United States Patent Office 2,759,674
Patented Aug. 21, 1956

2,759,674

THERMOSTATIC SUCTION PRESSURE REGULATOR FOR REFRIGERATION INSTALLATIONS

Hans Jörgensen, Hamburg, Germany

Application May 26, 1953, Serial No. 357,484

10 Claims. (Cl. 236—92)

This invention relates to a thermostatic suction pressure regulator for refrigeration installations.

Fully automatic refrigeration installations require equipment by which the temperature in the refrigeration space or in the medium to be cooled is kept constant. In order to keep the temperature constant, the refrigerating capacity of the refrigerating machine or of the evaporator must either be periodically shut-off or continuously throttled. This is effected by switching off or throttling the machine or the circulation of the cooling medium. The switching off of the machine is used when the installation operates with only one evaporator, since then switching on and off is not a problem. However, if several evaporators are connected to one machine, these evaporators operating at different temperatures, then the evaporators have to be switched on and off individually. This can be effected by switching on and off either the liquid or the suction pipe of the evaporator to be regulated.

Valves which are built into the suction pipe of a refrigerating plant and throttle or shut off the said pipe are known. The valves which are usually employed are the electrically controlled shut-off valves (electro-magnetic valves) which are operated by a thermostat. The thermostat breaks a circuit upon reaching the low temperature to which the said thermostat is set. The electromagnetic valve is thus without current and shuts off the liquid or the suction pipe by the weight of an armature.

Another known type of valve is a suction pressure regulator which is controlled by pressure and throttles the passage of the vapour of the refrigerating medium coming from the evaporator to such an extent that a constant pressure is always obtained in the evaporator. Since the temperature is dependent upon the pressure, there is also produced a constant evaporation temperature.

The invention relates to a suction pressure regulator which in accordance with the invention is controlled by pressure and temperature at the same time. For this purpose, the pressure-controlled regulating device, such as employed in a similar manner for maintaining constant evaporator pressure, has associated with it a temperature-controlled device which operates in such manner that an increase in temperature of the exploring member, the so-called feeler, effects an enlargement of the cross section of the flow opening for the refrigerating medium coming from the evaporator and thus a reduction of the pressure in the evaporator. Due to the lowering of temperature being produced by the reduction in pressure, the temperature difference between the evaporator and the medium to be cooled becomes larger and thus also the refrigerating capacity. With a drop in the temperature of the feeler, a higher evaporator pressure is produced by the temperature-controlled device, and a lower capacity of the evaporator is produced owing to the decreased temperature difference. Consequently, with this combined device controlled by temperature and pressure, a reduction of the refrigerating capacity is produced with a drop in temperature and an increase in such capacity with a rise in temperature, without there taking place a complete shutting off or a complete opening of the suction pipe. By this means, there are avoided the disadvantages which can occur with the control members described in the introduction.

The operation of the regulator as described above is produced by the fact that the thermostatic control device, with a rise in temperature and the rise in pressure which is caused thereby in the said control device, exerts a suction action on the pressure control means and, with a drop in temperature, exerts a pressure action on the pressure control means. The exact maintenance of the temperatures without influencing the pressures in the pipe line is produced by using a pressure-relieved shut-off member in the form of a piston.

For a better understanding of the invention and to show how the same may be carried into effect, reference will now be made to the accompanying drawings, in which.

Figure 1:
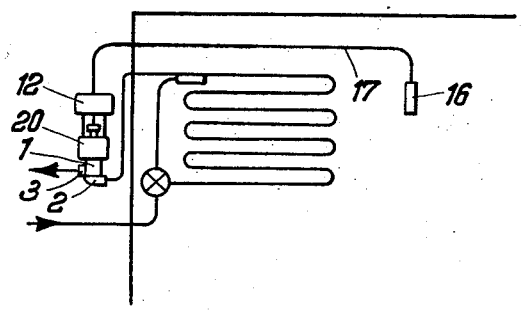
Figure 1 is a diagrammatic view of a temperature-control suction pressure regulator according to the invention fitted to an evaporator, in which the valve is arranged externally of the refrigeration space and the temperature feeler is arranged in the refrigeration space.
Figure 2:
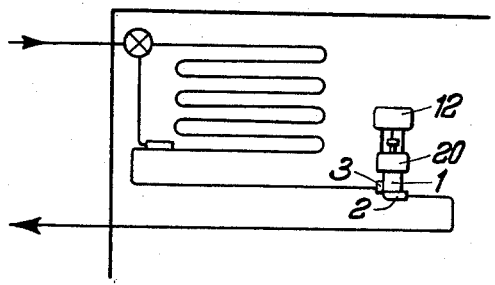
Figure 2 shows an arrangement without temperature feeler in which the valve is arranged in the refrigeration space. In this case, the feeler can be dispensed with, since a pressure container acts simultaneously as a feeler member.
Figure 3:
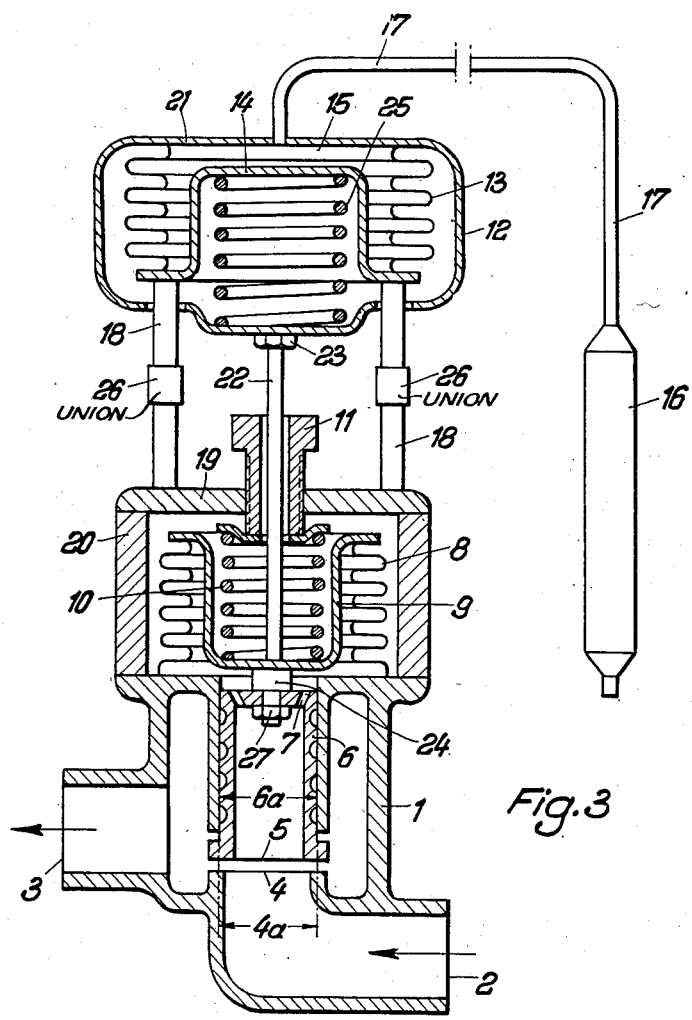
Figure 3 shows the novel suction pressure regulator in section.

The valve housing 1 comprises a connection 2 to the evaporator and a connection 3 to the suction pipe of a compressor. The valve seat 4 is adapted to be closed by the end face 5 of a control piston 6 having a diameter 6a which corresponds to the mean diameter 4a of the valve seat 4, whereby the piston is completely relieved of pressure. The control piston has a labyrinth packing in the form of grooves in order to produce a better sealing action. The pressure which is reached in the evaporator is transmitted through the holes 7 to the corrugated tube or bellows 8 which is rigidly connected through a casing 9 and a union 24, 27 with the control piston 6. The pressure on the corrugated tube 8 is counteracted by a spring 10, and by suitable tensioning of this spring by means of an adjusting screw 11 in the cover 19 of a sleeve 20; the spring 10 can be set at a predetermined pressure.

In addition, a thermostatic control device acts on the control piston 6. This consists of a casing 12 into which is fitted a corrugated tube or bellows 13 rigidly connected with a casing 14. A pressure which is transmitted from a temperature feeler 16 by means of a tube 17, reaches the internal space 15 of the corrugated tube 13, which forms a completely closed chamber. This pressure corresponds to the temperature which is explored by the feeler or thermostatic bulb 16.

The casing 14 is rigidly connected by means of columns 18 with the cover 19 of a sleeve 20. The sleeve 20 consists of heat insulating material so that the cold prevailing in the suction pipe cannot be transmitted to the thermostatic control means, since otherwise the thermostatic control means 12, 13, 14 will be varied by the influence of the temperature.

The pressure in the space 15 acts on the inner surface of the cover 21 and lifts the latter and thus also the entire casing 12 as it lifts from the valve seat 4. This movement on the valve is effected by the spindle 22 which is rigidly but detachably connected by a union 23 with the casing 12. Variations in pressure in the space 15 are transmitted to the casing 9 and thus to the corrugated tube 8 and the control piston 6, since the spindle 22 is coupled by a union 24, 27 with the casing 9 and the control piston 6. By making the corrugated tubes 8 and 13 of suitable dimensions and by filling the feeler member 16 with a suitable amount of control liquid, the valve can be so adapted that it is given the working characteristic which is most favourable at any time. The temperature control device is releasably connected with the pressure control device by means of unions 26 and the cover 19 and sleeve 20. By slackening off the unions 26 and also the nut 23, the temperature control device 12, 13, 14, 25 can be released from the pressure control device and thus removed without having to dismantle the pressure control device from the pipe. The temperature control device can readily be replaced if it becomes effective. The pressure control device can then continue to operate as a constant pressure valve without the temperature control device.

I claim:

1. A suction pressure regulator for compression refrigerators, comprising, in combination, a cooling chamber, a temperature and pressure responsive valve associated with said cooling chamber, said valve including a pressure control device including a first container having a first movable wall portion controlled by the pressure of the conduit for the refrigerant, said valve including a temperature control device including a second container having a second movable wall portion controlled by a fluid having a volume dependent on the temperature thereof, said fluid being influenced by the temperature in said cooling chamber, said pressure control device and said temperature control device being arranged at a distance from each other in a unitary assembly, columns rigidly connected, respectively, to said pressure control device and said temperature control device, unions detachably connecting, respectively, said columns, and a spindle coupling said pressure control device and said temperature control device so as to effect changes of equal sign in the flow cross section of the suction pressure regulator by pressure changes in the conduit for the refrigerant and temperature changes in the cooling chamber.

2. A regulator as claimed in claim 1, and a casing enclosing said second container and being connected thereto, said spindle being connected to said casing.

3. A regulator as claimed in claim 2, and first resilient means arranged for acting on one of said movable wall portions.

4. A regulator as claimed in claim 3, and means for adjusting the force exerted by said first resilient means.

5. A regulator as claimed in claim 4, and second resilient means arranged for acting on the other of said movable wall portions, said second resilient means acting in the same direction as said first resilient means.

6. A regulator as claimed in claim 1, and a temperature feeler arranged in said cooling chamber and connected to said second container, said regulator being arranged outside the cooling chamber.

7. A regulator as claimed in claim 1, said regulator being arranged in said cooling chamber, said second container being designed as a temperature feeler.

8. A regulator as claimed in claim 1, and a hollow piston having an end wall, said piston being adapted to act as throttling means for the conduit of the refrigerant, said end wall being coupled with said first movable wall portion.

9. A regulator as claimed in claim 8, said end wall having holes connecting the conduit for the refrigerant with the interior of said first container.

10. A regulator as claimed in claim 8, said hollow piston having an open end, and a seat arranged for co-operation with said open end of said hollow piston so as to relieve at least partly said throttling means from pressure whenever said throttling means is lifted from said seat thereof.

References Cited in the file of this patent

UNITED STATES PATENTS

| | | |
|---|---|---|
| 1,636,874 | Snader | July 26, 1927 |
| 1,682,227 | Johnsson | Aug. 28, 1928 |
| 1,974,631 | Slagel | Sept. 25, 1934 |
| 2,046,894 | Candor | July 7, 1936 |
| 2,097,539 | Tomlinson | Nov. 2, 1937 |
| 2,223,298 | Smith | Nov. 28, 1940 |